United States Patent [19]

Yoshida

[11] Patent Number: 4,507,132

[45] Date of Patent: Mar. 26, 1985

[54] FUEL EVAPORATION PREVENTING DEVICE

[75] Inventor: Shigeru Yoshida, Ohbu, Japan

[73] Assignee: Aisan Industry Co., Ltd., Ohbu, Japan

[21] Appl. No.: 629,456

[22] Filed: Jul. 10, 1984

[30] Foreign Application Priority Data

Aug. 12, 1983 [JP] Japan ............................... 58-148497

[51] Int. Cl.[3] ............................................ B01D 53/04

[52] U.S. Cl. ........................................ 55/320; 55/387; 55/476; 123/519

[58] Field of Search ................. 55/316, 320, 331, 387, 55/440, 464, 476; 123/518-521

[56] References Cited

U.S. PATENT DOCUMENTS

| | | | |
|---|---|---|---|
| 1,706,676 | 3/1929 | Paasche | 55/476 X |
| 1,802,941 | 4/1931 | Drager | 55/387 X |
| 2,335,901 | 12/1943 | Ayers, Jr. | 55/387 X |
| 3,479,146 | 11/1969 | Hochman et al. | 55/316 X |
| 3,628,517 | 12/1971 | Soberski | 123/520 |
| 4,173,207 | 11/1979 | Hiramatsu | 123/519 |
| 4,280,466 | 7/1981 | Walters | 123/520 |
| 4,306,894 | 12/1981 | Fukami et al. | 123/519 X |
| 4,331,120 | 5/1982 | Hiramatu et al. | 123/520 X |
| 4,338,106 | 7/1982 | Mizuno et al. | 123/519 X |
| 4,403,587 | 9/1983 | Mizuno et al. | 123/519 |
| 4,448,594 | 5/1984 | Kozawa | 123/519 X |
| 4,454,849 | 6/1984 | Mizuno et al. | 123/519 |

FOREIGN PATENT DOCUMENTS

| | | | |
|---|---|---|---|
| 53-19729 | 6/1978 | Japan . | |
| 55-45748 | 11/1980 | Japan . | |
| 56-69455 | 6/1981 | Japan . | |
| 153956 | 9/1982 | Japan | 123/519 |
| 57-157053 | 9/1982 | Japan . | |
| 176351 | 10/1982 | Japan | 123/519 |
| 57-59909 | 12/1982 | Japan . | |
| 13149 | 1/1983 | Japan | 123/519 |

*Primary Examiner*—Robert Spitzer
*Attorney, Agent, or Firm*—Cushman, Darby & Cushman

[57] ABSTRACT

A fuel evaporation preventing device has a casing, an absorbent filling the casing and adapted to absorb the fuel vapor, a fuel vapor introduction pipe having one end embedded in the layer of the absorbent, and a flow deflector opening towards the fuel vapor introduction pipe. The flow deflector has a plurality of box-shaped pleats defining a plurality of slits extending vertically, so that the fuel vapor is distributed over wide area in the canister to permit greater part of the absorbent to take part in the absorption and release of the fuel vapor.

2 Claims, 9 Drawing Figures

FUEL EVAPORATION PREVENTING DEVICE

BACKGROUND OF THE INVENTION

The present invention relates to a device for preventing evaporation of fuel generally referred to as canister and adapted to catch fuel evaporated from the fuel supplying system including fuel tank, carburetor and so forth of a vehicle, thereby to avoid air pollution by the evaporated fuel.

Hitherto, such fuel evaporation preventing devices have been proposed and broadly used as incorporating a canister having a fuel absorbent which absorbs the evaporated fuel and releases the same during operation of the engine thereby to supply the engine with the released fuel. Examples of the fuel evaporation preventing device of the kind described as shown in Japanese Patent Publication Nos. 19729/1978, and 45748/1980. Devices are proposed also for allowing the utilization of an large portion as possible of the absorbent by means of a flow detector which serves to deflect and diversify the flow of the evaporated fuel to make efficient use of large portion of the absorbent. Examples of such system as shown in, for example, Japanese Patent Publication No. 59909/1982 and Japanese Patent Laid-Open Nos. 69455/1981 and 157053/1982.

For instance, the canister shown in Japanese Patent Laid-Open Publication No. 157053/1982 has an absorbent and a flow deflector housed by a casing. This flow defector includes a conical portion and a tubular portion connected to the conical portion. The tubular portion is provided at its upper end with a check valve. In this canister, the fuel vapor evaporated from the fuel tank during suspension of engine operation is introduced through a fuel vapor introduction pipe into the absorbent of the canister. The fuel vapor flows obliquely upwardly along the inner surface of the conical portion of the flow defector and flows over the upper brim of the conical portion. The fuel then flows downwardly. This downward flow of the fuel vapor, however, does not come into the portion of the absorbent adjacent to the conical portion and the tubular portion of the flow deflector, because it tends to flow along the shortest path which minimizes the flow resistance. Accordingly, it can not make efficient use of the portion of the absorbent around the conical and tubular portions of the flow deflector.

Another problem of this known arrangement is that the material of the absorbent above the check valve tends to be pulverized due to the vibration to cause troubles such as sealing failure and/or stick of the check value. The sealing failure of the check valve may cause a leak of the fuel vapor therethrough to a second diffusion chamber, from which the fuel vapor is relieved to the atmosphere without being absorbed by the absorbent. On the other hand, the stick of the check value causes a problem that, since the air sucked through the atmospheric port in the bottom of the canister flows detouring the flow deflector, the fuel vapor caught by the portion of the absorbent in the conical portion is not released from the absorbent.

Furthermore, it is to be noted that the flow deflector is rendered complicated in construction and expensive due to the use of the check valve.

Thus, the conventional fuel evaporation preventing device suffers from various disadvantages such as the complicated construction, only partial use of the flow deflector which is intended for diversifying the flow of fuel and only limited regeneration efficiency of the canister.

SUMMARY OF THE INVENTION

Accordingly, it is an object of the invention to provide a fuel evaporation preventing device improved to overcome the above-described problems of the prior art.

It is another object of the invention to provide a fuel evaporation preventing device having a flow deflector of a simple construction constituted by a plurality of box-like pleats arranged to define vertical slits thereby to allow the fuel vapor to come into all portions of the absorbent in the casing and release of the fuel therefrom, thereby to maximize the regeneration efficiency of the canister, while avoiding unfavourable influence of vibration thereby to ensure a high reliability of operation of the device.

To these ends, according to an aspect of the invention, there is provided a fuel evaporation preventing device comprising: a casing; an absorbent filling the casing and adapted to absorb the fuel vapor; a fuel vapor introduction pipe having one end embedded in the layer of the absorbent; and a flow deflector opening towards the fuel vapor introduction pipe; wherein the flow deflector has a plurality of box-shaped pleats defining a plurality of slits extending vertically.

According to another aspect of the invention, there is provided a fuel evaporation preventing device comprising: a casing; an absorbent filling the casing and adapted to absorb the fuel vapor; a fuel vapor introduction pipe having one end embedded in the layer of the absorbent; and a flow deflector opening towards the fuel vapor introduction pipe; wherein the flow deflector has a plurality of box-shaped pleats defining a plurality of slits extending vertically, a bottom wall having a central passage hole, and a shielding plate disposed just above the passage hole and having a size greater than that of the passage hole.

DESCRIPTION OF THE PREFERRED EMBODIMENTS

Figure 1:
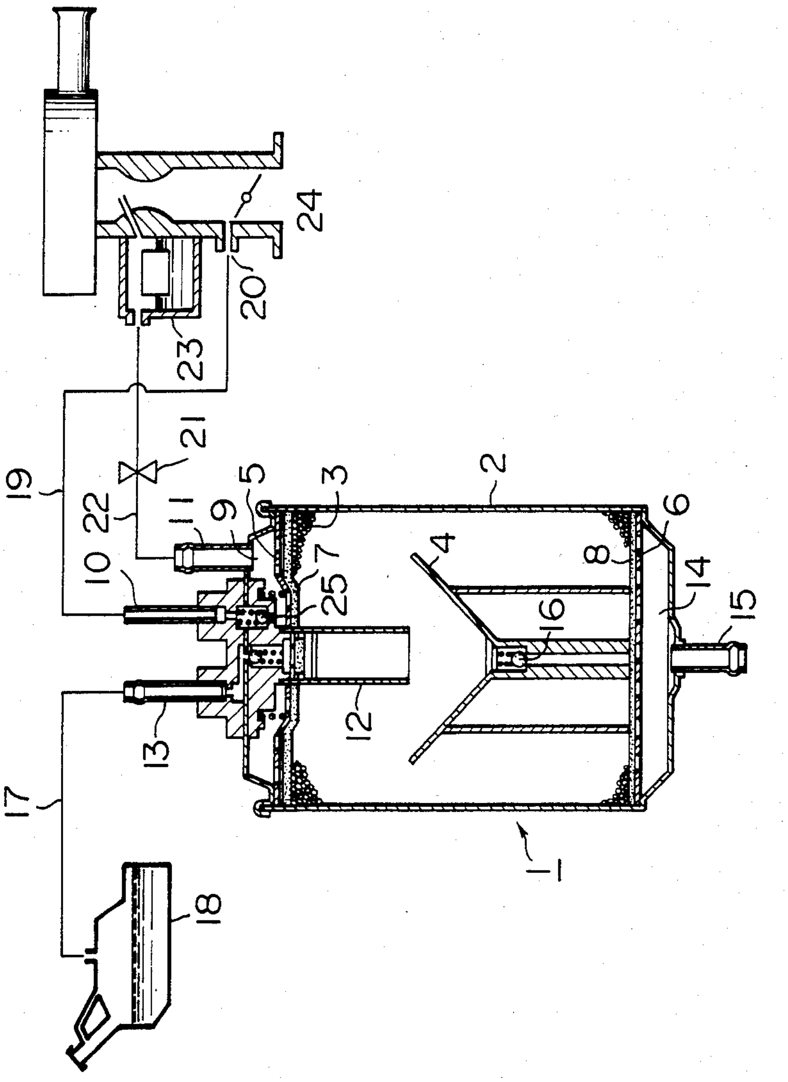
FIG. 1 PRIOR ART
FIG. 1 is a sectional view of a fuel evaporation preventing device (canister) combined with the fuel tank and the carburetor of the fuel system of a vehicle.
Figure 2:
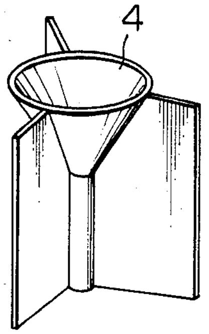
FIG. 2 PRIOR ART
FIG. 2 is a perspective view of a flow deflector incorporated in the device shown in FIG. 1.
Figure 3:
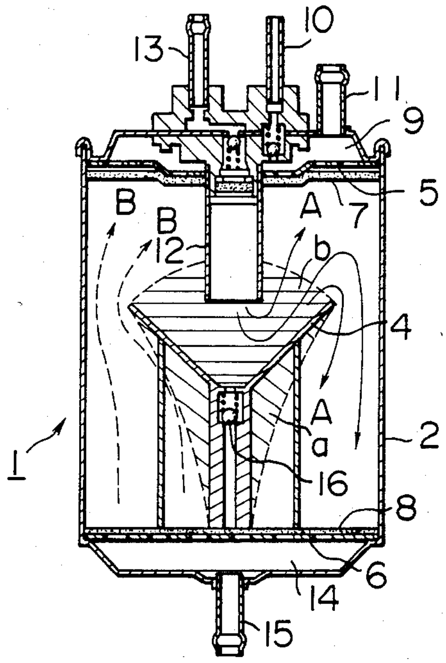
FIG. 3 PRIOR ART
FIG. 3 is a sectional view for explaining the operation of the canister shown in FIG. 1.

FIGS. 1 to 3 in combination show a conventional fuel evaporation preventing device, i.e. canister, generally designated at a numeral 1. As will be best seen from FIG. 1, the canister 1 has a casing 2 accomodating an absorbent 3 together with a flow deflector 4 having a configuration as shown in FIG. 2. Reference numerals 5 and 6 denote perforated plates formed from a metal by punching, while reference numerals 7 and 8 designated glass wool. A first diffusion chamber 9 is communicated with a purge port 10 and an outer vent port 11, and also with a chamber accomodating the absorbent through the perforated plate 5. A reference numeral 12 denotes a fuel vapor introduction pipe having its lower end embedded in the absorbent 3 and its upper end communicated with a tank port 13. Reference numerals 14, 15 and 16 denote, respectively, a second diffusion chamber, atmospheric port and a check valve. The tank port 13 leads to a fuel tank 18 through a first evaporated fuel passage 17, while the purge port 10 communicates with the fuel vapor extraction port 20 in the carburetor through a mixture passage 19. The outer vent port 11 is communicated with the float chamber 23 of the carburetor through a second fuel vapor passage 22 provided with a stop valve 21. A reference numeral 24 designates a throttle valve mounted in the carburetor.

In operation, the fuel vapor evaporated from the fuel tank during suspension of operation of the fuel vapor is introduced into the absorbent of the canister from the tank port 13 through the fuel vapor introduction pipe 12. The flow of the thus introduced fuel vapor is deflected by the conical portion of the flow deflector 4 to flow obliquely upwardly along the wall of the flow deflector 4. The fuel vapor, after flowing over the upper brim of the conical portion of the flow deflector 4, flows downwardly as indicated by arrows A into the second diffusion chamber 14. In the meantime, the fuel vapor is progressively absorbed by the absorbent 3. Then, as the intake vacuum is increased after starting of the engine, the check valve 25 is opened so that air is inducted into the casing 2 through the atmospheric port 15 and past the second diffusion chamber 14. Consequently, the fuel vapor is separated and carried away from the absorbent by the air to the carburetor through the purge port 10 and past the mixture passage 19. The stop valve 21 is a solenoid valve which opens and closes the passage in response to turning on and off of the ignition switch. Namely, the stop valve 21 allows the canister to be communicated with the float chamber 23 of the carburetor only when the ignition switch takes the off position.

This known canister, however, suffers from the following problems. Namely, the fuel vapor flows first obliquely upwardly along the flow deflector and then downwardly after flowing over the upper brim of the flow deflector, and this downward flow of the fuel vapor tends to take the shortest path of minimum resistance as indicated by arrows A. Thus, the portion of the absorbent shown by hatching in FIG. 3 is not impregnated with the fuel vapor and, hence, cannot be utilized effectively. Another problem is that the portion of the absorbent above the check valve tends to be pulverized by the vibration to cause a sealing failure and/or stick of the check valve 16. Such sealing failure of the check valve may undesirably allow the fuel vapor to be leaked through the check valve 16 into the second diffusion chamber 14 and to be relieved directly from the second diffusion chamber 14 into the atmosphere without being absorbed by the absorbent. On the other hand, a stick of the check valve 16 cause the air sucked from the atmospheric port 12 during operation of the engine to flow detouring the flow detector 4 as indicated by arrows B. Consequently, no flow of air exists in the area indicated at (b) in FIG. 3 so that the fuel vapor absorbed by the portion of the absorbent in this area cannot be released from the absorbent. In addition, the flow deflector of the conventional system is complicated in construction and expensive due to the use of the check valve 16.

These problems of the conventional canister, however, can be overcome by the canister of the invention as will be understood from the following description.

Figure 4:
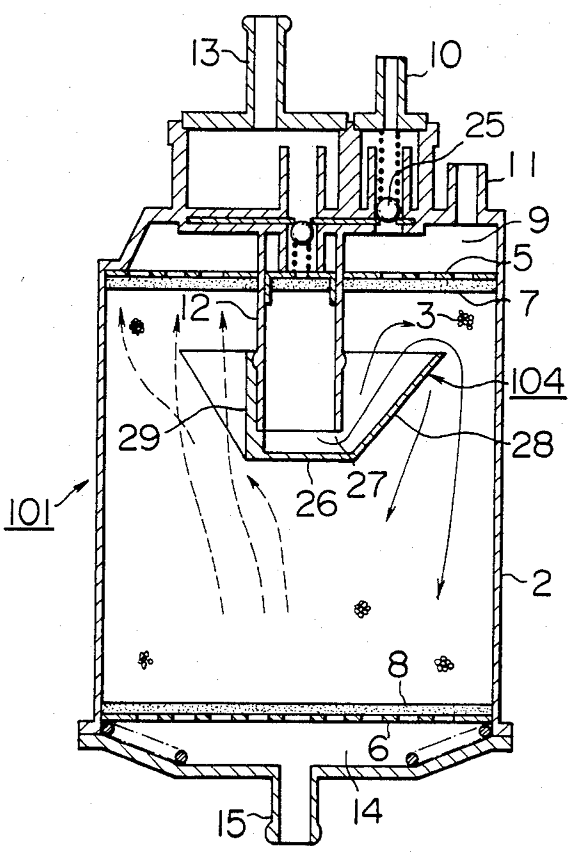
FIG. 4 is a vertical sectional view of an embodiment of the canister in accordance with the invention.

FIG. 4 shows a first embodiment of the canister of the invention, generally designated by reference numeral 101. In the drawing, the same reference numerals are used to denote the same parts or members as those in FIGS. 1 to 3 showing the conventional canister. The canister 101 of the invention has a flow deflector 104 shown in FIG. 5. This flow deflector 104 is connected to the fuel vapor introduction pipe 12 by press-fitting or welding. The bottom wall 26 of the flow deflector 104 is slightly spaced below the lower open end of the fuel vapor introduction pipe 12 so as to form therebetween a passage 27. As will be seen from FIG. 5, the flow deflector 104 has outer peripheral wall sections 28 constituting parts of a conical surface extending upwardly from the bottom wall 26, inner peripheral wall sections 29 constituting parts of a cylindrical surface extending upwardly from the bottom wall 26, and vertical side walls 30 connecting the outer peripheral wall sections 28 to the adjacent inner peripheral wall sections 29. The outer peripheral wall sections 28, side walls 30 and the inner peripheral wall sections 29 in combination constitute a plurality of box-shaped pleats 31*a* which define vertically extending slits 31*b*. The example of the flow deflector shown in FIG. 5 employs six box-shaped pleats 31*a* and six vertical slits 31*b* defined by six outer peripheral wall sections 28, twelve side walls 30 and six inner peripheral wall sections 29.

In the operation of the canister 101 shown in FIG. 4, the fuel vapor coming out of the passage 27 flows upwardly through a plurality of U-shaped channels defined by the outer peripheral wall sections 28 and adjacent side walls 30, and flows over the upper end brim of the flow deflector 104. The fuel vapor then flows down through the absorbent around the flow deflector 104. During flowing through the absorbent in the manner described, the fuel vapor is progressively absorbed by the absorbent. The downward flow of the fuel vapor is divided into components which flow down along the outer surfaces of the outer peripheral wall sections spaced radially away from the central axis of the canister and components which flow down through the slits 31*b*, so that the portion of the absorbent just under the bottom wall 26 effectively takes part in the absorption of the fuel vapor.

During the operation of the engine, the air flows from the atmospheric port 15 into the casing through the second diffusion chamber 14 and flows upwardly also through the slits 31*b* so that the fuel vapor is relieved without fail from side area over the absorbent.

Figure 5:
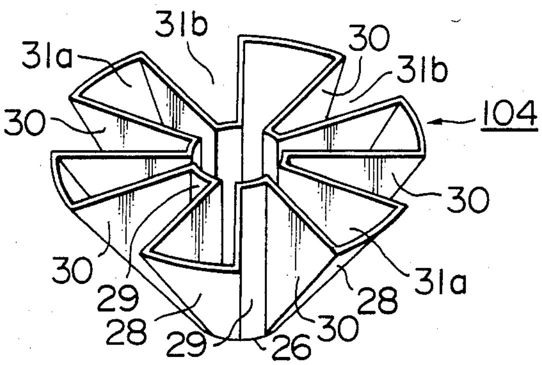
FIGS. 5 and 6 are perspective views of different forms of the flow deflector incorporated in the canister in accordance with the invention.
Figure 6:
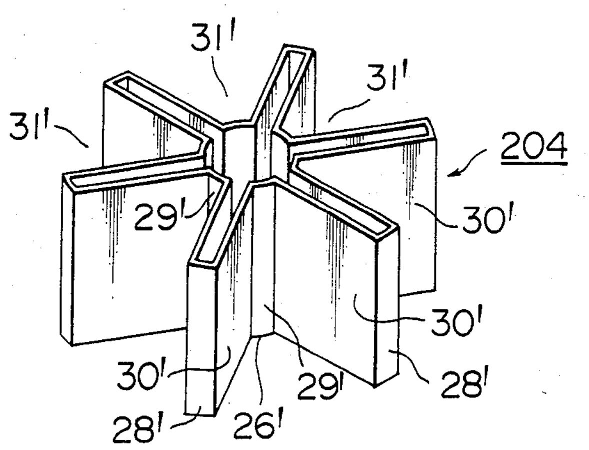

FIG. 6 shows another example of the fuel deflector generally designated by reference numeral 204. This example is discriminated from that shown in FIG. 5 in that the outer peripheral wall sections 28' of the flow deflector 204 constitute parts of a cylindrical surface, but the function of this flow deflector 204 is materially the same as that of the flow deflector shown in FIG. 5.

Figure 7:
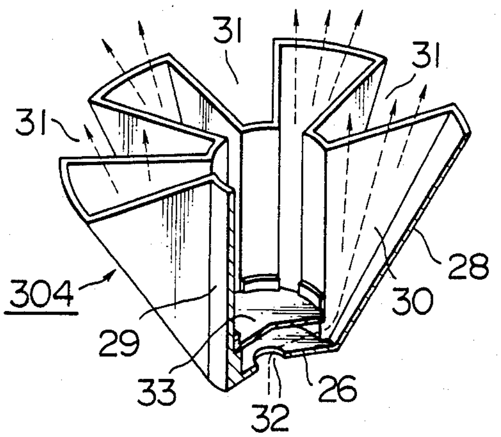
FIG. 7 is a partly-sectional perspective view of a different flow deflector.

FIG. 7 shows still another example of the flow deflector 304 which resembles the flow deflector 104, but is discriminated from the latter by a passage hole 32 formed in the bottom wall and a shielding plate 33 disposed above the passage hole 32.

The shielding plate 33 is a disc-shaped member having a diameter substantially equal to the diameter of the cylinder, the wall of which is partially constituted by the inner peripheral wall sections 29, and is connected to the inner surface of the inner peripheral wall sections 29. This flow deflector 304 is connected to the fuel vapor introduction pipe 12 such that a passage 27 is formed between the shielding plate 33 and the lower end of the fuel vapor introduction pipe 12. In the canister having the flow deflector 304 shown in FIG. 7, the air is allowed to flow also in the direction indicated by broken-line arrows through the passage hole 32, so that the fuel vapor can be released without fail even from the portions of the absorbent just under the flow deflector 304 and the portions of the absorbent in the channels.

Figure 8:
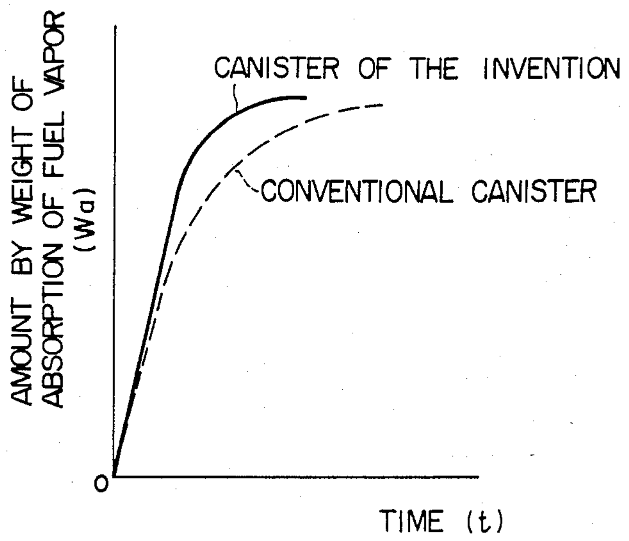
FIGS. 8 and 9 are diagrams showing the performance of the canister of the invention in comparison with that of the conventional canister.
Figure 9:
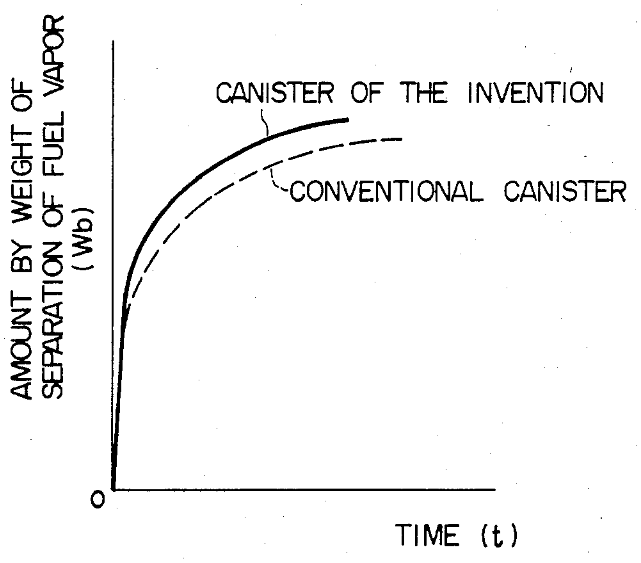

FIGS. 8 and 9 show the characteristics of the canister of the invention having the flow deflector shown in FIG. 5, in comparison with those of the conventional canister. More specifically, in the drawings, the characteristics of the canister of the invention are shown by full-line curves, while the broken-line curves show the characteristics of the conventional canister. As seen from the drawings, the canister of the invention exhibits greater rates of absorption and separation of fuel vapor in terms of weight per unit time.

As has been described, in the canister of the invention, the fuel vapor is distributed widely over the entire portion of the fuel vapor by the use of a specific flow deflector and, in addition, a vertical flow of the fuel vapor is obtained even in the portion of the absorbent near the fuel vapor introduction pipe thanks to the provision of the slits, so that the portions of the absorbent marked at (a) and (b) in FIG. 3, which could not be used effectively in the conventional canister, can be put into effective use to remarkably improve the regeneration efficiency of the canister. The improvement in the regeneration efficiency in turn provides the same absorption capacity with reduced amount of absorbent to permit a reduction in the size and weight of the canister as a whole. Futhermore, since the check valve employed in the conventional canister is eliminated, it is possible to attain a lower cost and higher reliability of the canister. Furthermore, the canister of the invention enables the greater part of the absorbent to release the fuel vapor than in the conventional canister.

What is claimed is:

1. A fuel evaporation preventing device comprising: a casing; and absorbent filling said casing and adapted to absorb the fuel vapor; a fuel vapor introduction pipe having one end embedded in the layer of said absorbent; and a flow deflector opening towards said fuel vapor introduction pipe; wherein said flow deflector has a plurality of box-shaped pleats defining a plurality of slits extending vertically.

2. A fuel evaporation preventing device comprising: a casing; an absorbent filling said casing and adapted to absorb the fuel vapor; a fuel vapor introduction pipe having one end embedded in the layer of said absorbent; and a flow deflector opening towards said fuel vapor introduction pipe; wherein said flow deflector has a plurality of box-shaped pleats defining a plurality of slits extending vertically, a bottom wall having a central passage hole, and a shielding plate disposed just above said passage hole and having a size greater than that of said passage hole.

* * * * *